(12) United States Patent
Tutewohl

(10) Patent No.: US 9,357,753 B1
(45) Date of Patent: Jun. 7, 2016

(54) AQUARIUM AND POND FILTER SUCTION BARRIER

(71) Applicant: Joseph Tutewohl, Bay Shore, NY (US)

(72) Inventor: Joseph Tutewohl, Bay Shore, NY (US)

( * ) Notice: Subject to any disclaimer, the term of this patent is extended or adjusted under 35 U.S.C. 154(b) by 90 days.

(21) Appl. No.: 14/188,124

(22) Filed: Feb. 24, 2014

Related U.S. Application Data

(60) Provisional application No. 61/768,776, filed on Feb. 25, 2013.

(51) Int. Cl.
*A01K 63/04* (2006.01)

(52) U.S. Cl.
CPC .................................. *A01K 63/045* (2013.01)

(58) Field of Classification Search
CPC ................................................... A01K 63/045
USPC ............. 210/167.21, 167.25, 167.27, 170.02, 210/232, 416.1, 416.2, 459, 460; 119/226, 119/227, 259
See application file for complete search history.

(56) References Cited

U.S. PATENT DOCUMENTS

| | | | | |
|---|---|---|---|---|
| 4,035,299 A | * | 7/1977 | Vroeginday | 210/167.27 |
| 4,058,465 A | * | 11/1977 | McKee | 210/356 |
| 4,761,227 A | * | 8/1988 | Willinger et al. | 210/167.27 |
| 4,897,188 A | * | 1/1990 | Ogawa | 210/167.22 |
| 5,626,747 A | * | 5/1997 | Ritzow et al. | 210/167.21 |
| 6,051,132 A | * | 4/2000 | Flores | 210/167.21 |
| 6,796,210 B2 | * | 9/2004 | Baron | 83/676 |
| 2006/0113230 A1 | * | 6/2006 | Carley et al. | 210/169 |
| 2006/0180531 A1 | * | 8/2006 | Bonifer | 210/169 |
| 2009/0056638 A1 | * | 3/2009 | Ting | A01K 63/045 119/248 |

FOREIGN PATENT DOCUMENTS

JP 3-7517 A * 1/1991

* cited by examiner

*Primary Examiner* — Fred Prince
(74) *Attorney, Agent, or Firm* — Galgano IP Law PLLC; Thomas M. Galgano; Jessica G. McDonald

(57) ABSTRACT

A filter intake suction guard for an aquarium or fish pond filter having a tubular filter intake tube. The suction guard having a substantially enclosed hollow housing with an outlet opening defined therein for receipt of a filter intake tube therein with a first open end of the filter intake tube in fluid communication within the housing interior. The housing also having a first wall which is spaced apart from the first open end of the filter intake tube, and having a plurality of intake openings defined therein and which are configured and dimensioned to prevent fish from entering the housing interior but allow water to enter the housing interior and exit the housing interior via the first open end of the filter intake tube.

19 Claims, 4 Drawing Sheets

AQUARIUM AND POND FILTER SUCTION BARRIER

CROSS-REFERENCE TO RELATED APPLICATION

This application claims benefit from U.S. Provisional Patent Application Ser. No. 61/768,776, filed Feb. 25, 2013, the contents of which are hereby incorporated by reference.

BACKGROUND OF THE INVENTION

1. Field of the Invention

The present invention is in the field of aquarium and pond supplies and, more particularly, the present invention is directed to a barrier or guard for a power filter suction intake tube of an aquarium or fish pond filter.

2. Brief Description of the Prior Art

Conventional aquarium or pond filters include a power intake extension tube or suction tube which extends into the aquarium or pond and suctions water from the aquarium or pond into the filter for cleaning. However, these power filter intake extension tubes or suction tubes are among the top reason for healthy fish loss.

Particularly, when small to medium sized fish swim too close to the filter intake suction tube, and/or try to eat food trapped within the filter intake tube, they have a high risk of becoming a victim of filter suction. It is therefore desirable to provide a barrier or guard which prevents the suction of fish against or into the filter intake tube.

To Applicant's knowledge, no effective solution to this problem has been proposed which is simple and highly effective to minimize, if not eliminate, healthy fish loss from the filter suction, as in the present invention.

SUMMARY OF THE INVENTION

It is therefore an object of the present invention to provide a novel filter intake suction guard for an aquarium or pond having a filter with a tubular filter intake tube.

It is also an object of the present invention to provide a filter intake suction guard which prevents fish from getting too close to the filter intake tube and being suctioned thereby.

It is another object of the present invention to provide a filter intake suction guard which reduces or prevents healthy fish loss in an aquarium or fish pond.

It is a further object of the present invention to provide a filter intake suction guard which reduces or prevents the suction of fish against a filter intake tube.

It is another object of the present invention to provide a filter intake suction guard which is removable for cleaning.

Certain of the foregoing and related objects are readily attained according to the present invention by the provision of a filter intake suction guard for a filter of the type having a tubular filter intake tube with first and second open ends, comprising a substantially enclosed hollow housing defining a housing interior therein and having an outlet opening defined therein which is configured and dimensioned for receipt of the filter intake tube therein with the first open end of the filter intake tube in fluid communication within said housing interior, said housing further comprising a first wall which is spaced apart from the first open end of the filter intake tube, said first wall comprising a plurality of intake openings defined in at least a portion thereof and which are configured and dimensioned to prevent fish from entering said housing interior but allow water to enter said housing interior and exit said housing interior via the first open end of the filter intake tube.

In the preferred embodiment, said first wall is a sidewall; said housing further comprises a top wall and a bottom base plate, each having an outer peripheral edge; and said sidewall is generally upstanding and has an upper edge connected to said outer peripheral edge of said top wall and a lower edge connected to said outer peripheral edge of said base plate, and wherein said outlet opening is disposed on said top wall and said plurality of intake openings are disposed on at least a portion of said sidewall. Preferably, said base plate of said housing is removable. It is also preferred that said sidewall has a planar portion and a curved portion, and said top wall and said base plate are half oval-shaped and planar.

It is also advantageous that the guard further comprises means for removably securing said housing to an aquarium. Preferably, said means for removably securing said housing to an aquarium is a suction cup connected to said housing. Desirably, said plurality of intake openings are vertically extending slots on said curved portion of said sidewall. More particularly, it is preferred that said plurality of inlet openings have a width in the range of about 1/16" to 1/2".

The preferred embodiment further comprises means for altering the diameter of said outlet opening. Advantageously, said means for altering the diameter of said outlet opening comprises a first opening defined in said top wall and a removable ring disposed within said first opening and attached to said top wall of said housing via at least one radially extending frangible tab. More preferably, the guard further comprises four radially extending frangible tabs disposed approximately 90 degrees apart.

In another preferred embodiment, the guard further comprises a net having a plurality of mesh-like openings defined therein for enveloping at least said plurality of inlet openings of said housing, and wherein said openings in said net have diameters which are smaller than said inlet openings of said housing. Desirably, said first wall of said housing is spaced a predetermined distance from the first open end of the filter intake tube to prevent fish from being suctioned by the filter intake tube. More particularly, in a preferred embodiment said first wall is spaced apart in the range of approximately 1" to 4" from the first open end of the filter intake tube. Advantageously, said outlet opening has a diameter which generally corresponds to an outer diameter of the filter intake tube.

Additionally, certain of the foregoing and related objects are also readily attained according to the present invention by the provision of a filter intake suction guard assembly for a filter, comprising a generally tubular filter intake tube having opposite first and second open ends, which is connectable to the filter via said second end; a filter intake suction guard connected to said filter intake tube, comprising a substantially enclosed hollow housing defining a housing interior therein and having an outlet opening defined therein for receipt of said filter intake tube therein with the first open end of the filter intake tube in fluid communication within said housing interior, said housing further comprising a first wall which is spaced apart from said first open end of said filter intake tube, said first wall comprising a plurality of intake openings defined in at least a portion thereof and which are configured and dimensioned to prevent fish from entering said housing interior but allow water to enter said housing interior and exit said housing interior via said first open end of said filter intake tube. In one preferred embodiment, said filter intake tube and said guard are integral. In another preferred embodiment, said filter intake tube and said guard are removably connected together.

Furthermore, certain of the foregoing and related objects are also readily attained according to the present invention by the provision of a method of preventing fish from entering a filter, comprising providing a filter and a filter intake tube with first and second open ends; providing a filter intake suction guard for said filter intake tube, comprising a substantially enclosed hollow housing defining a housing interior therein and having an outlet opening defined therein which is configured and dimensioned for receipt of said filter intake tube therein with said first open end of said filter intake tube in fluid communication within said housing interior, said housing further comprising a first wall which is spaced apart from said first open end of said filter intake tube, said first wall comprising a plurality of intake openings defined in at least a portion thereof and which are configured and dimensioned to prevent fish from entering said housing interior but allow water to enter said housing interior and exit said housing interior via said first open end of said filter intake tube; and positioning said intake tube within said outlet opening of said housing with said first open end of said intake tube in fluid communication within said housing interior.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

DETAILED DESCRIPTION OF THE PREFERRED EMBODIMENTS

Figure 1:
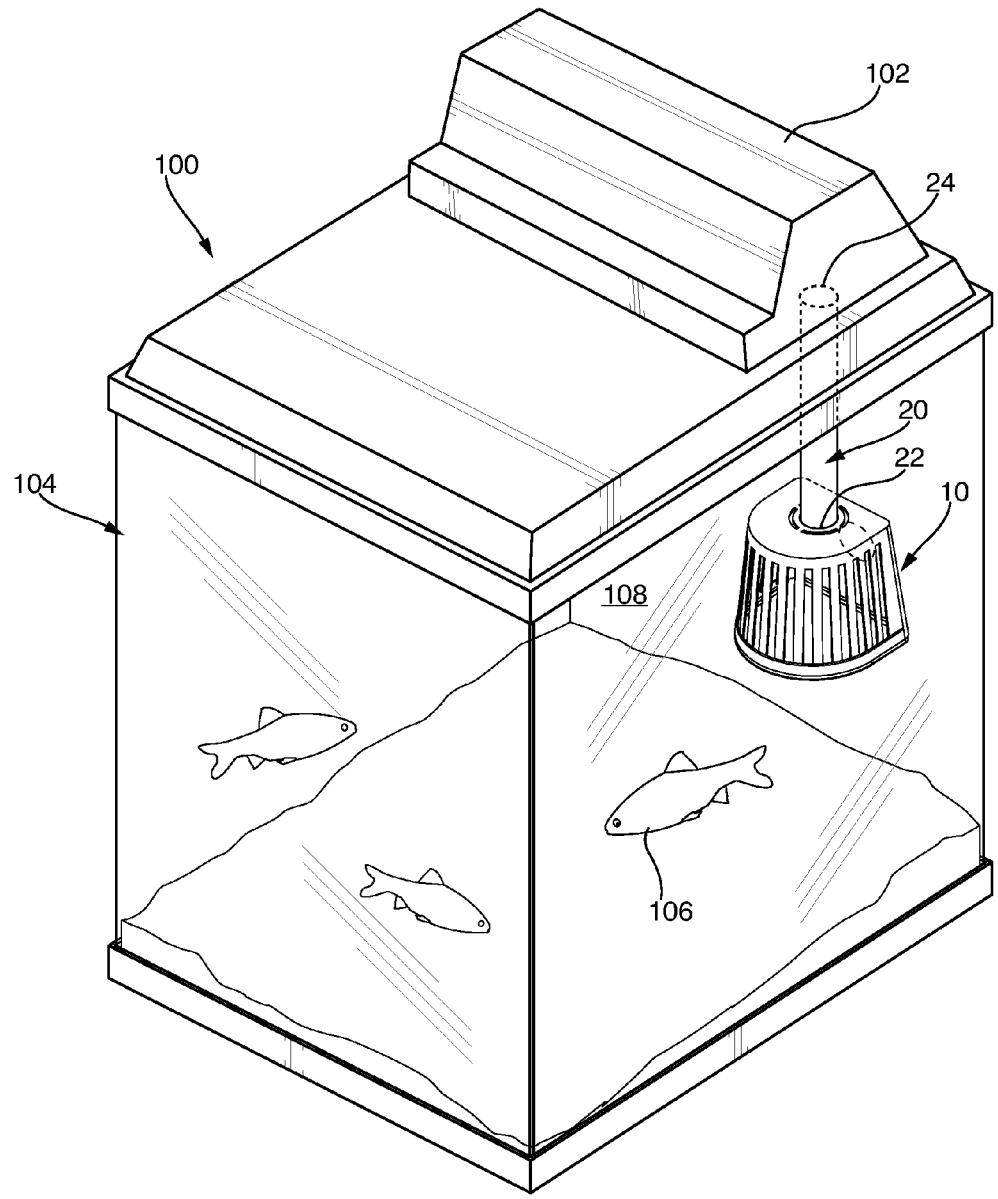
FIG. 1 is a perspective view of an aquarium having a filter with a filter intake tube which is connected to the filter intake suction guard, according to the present invention.

Turning now in detail to the drawings and, in particular, FIG. 1 which illustrates the filter intake suction barrier or guard, according to the present invention, generally designated by reference numeral 10. As seen in FIG. 1, the guard 10 is for use in connection with a conventional aquarium 100 or a fish pond (not shown), having a conventional powered filter 102. Typically, filters 102 have a generally tubular filter intake tube, suction tube, or filter intake extension tube, all hereinafter referred to collectively or singly as filter intake tube 20. Filter intake tube 20 is connected to the aquarium or pond filter 102 on one end thereof and extends into the tank 104 of aquarium 100 or into the fish pond. Typically, aquarium filter intake tubes have a diameter in the range of approximately, ½" to 1⅛" and fish pond filter intake tubes have a diameter of approximately 1½" to 2". The suction action created by the filter 102 draws water held within tank 104 of aquarium 100 or pond, into and through the filter intake tube 20 and, in turn, into the filter 102 for cleaning. As seen best in FIGS. 1 and 4, filter intake tube 20 typically has two opposite open ends, namely a first open end 22 which is disposed within the interior of tank 104 and a second open end 24 which is connectable to filter 102. However, as mentioned above, often times fish 106 are suctioned against or into filter intake tube 20 because they swim too close to the filter intake tube 20 and/or try to eat food stuck on or near first open end 22 of filter intake tube 20.

As illustrated in FIG. 1, guard 10, according to the present invention, is received over or disposed flush against first open end 22 of filter intake tube 20 to act as a guard or barrier to prevent fish 106 from swimming too close to first open end 22 where the fish 106 may be subjected to strong suction forces which could injure or kill the fish. Thus, the guard 10 is utilized to minimize, if not prevent, the fish 106 from being suctioned against or into filter intake tube 20. Particularly, guard 10 keeps fish 106 a safe distance away from the powerful filter suction without a reduction of water circulation. This creates a safe, clean, and worry free aquarium 100 or pond for the fish 106 by minimizing and/or preventing healthy fish 106 from getting suctioned against or into filter 102 via filter intake tube 20. Filter suction guard 10 is designed for both large and small power filter intake tubes 20 and keeps fish safely away from the filter suction with no reduction of water circulation. Filter suction guard 10 works with both hang on tank filters and canister filters as well as fish pond filters.

Figure 2:
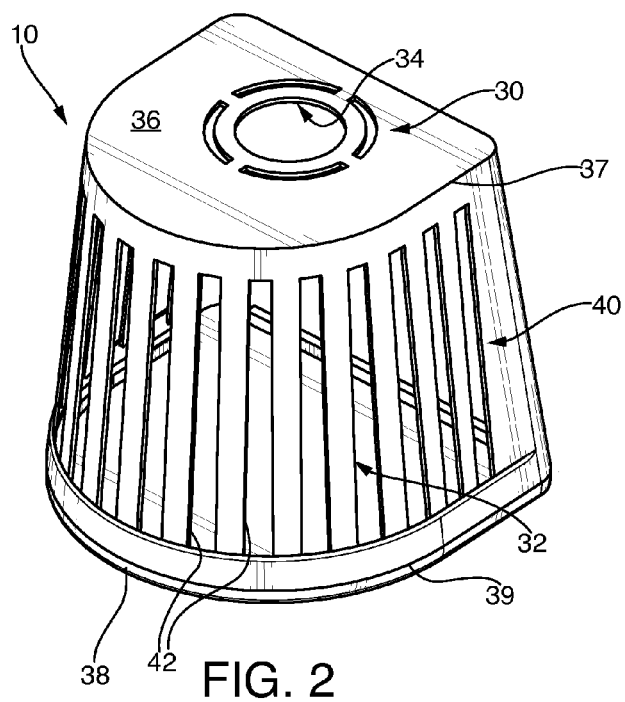
FIG. 2 is a top and side perspective view of the housing of the filter intake suction guard, according to the present invention.

As seen best in FIG. 2, guard 10 includes a substantially enclosed hollow housing 30 defining a housing interior 32 therein. Housing 30 includes a top wall 36, a base plate 38, and a sidewall 40. Particularly, as seen best in FIG. 2, top wall 36 and base plate 38 each have an outer peripheral edge 37 and 39, respectively, and sidewall 40 is generally upstanding and has an upper edge connected to outer peripheral edge 37 of top wall 36 and a lower edge connected to outer peripheral edge 39 of base plate 38. In a preferred embodiment, as seen best in FIGS. 2 and 3, top wall 36 and base plate 38 are half oval-shaped and planar. However, it can be appreciated that housing 30 can assume other shapes and/or configurations. The planar side of top wall 36 and base plate 38 allows for housing 30 to be placed flush against a wall 108 of an aquarium 100, as seen in FIG. 1 or wall of a fish pond (not shown).

Preferably, base plate 38 of housing 30 is removable for both cleaning purposes and for installation of guard 10. Base plate 38 is solid and provides stability and support to guard 10. Base plate 38 is also preferably connected to the lower edge of sidewall 40 via a friction or snap fit, to hold the components together.

Figure 4:
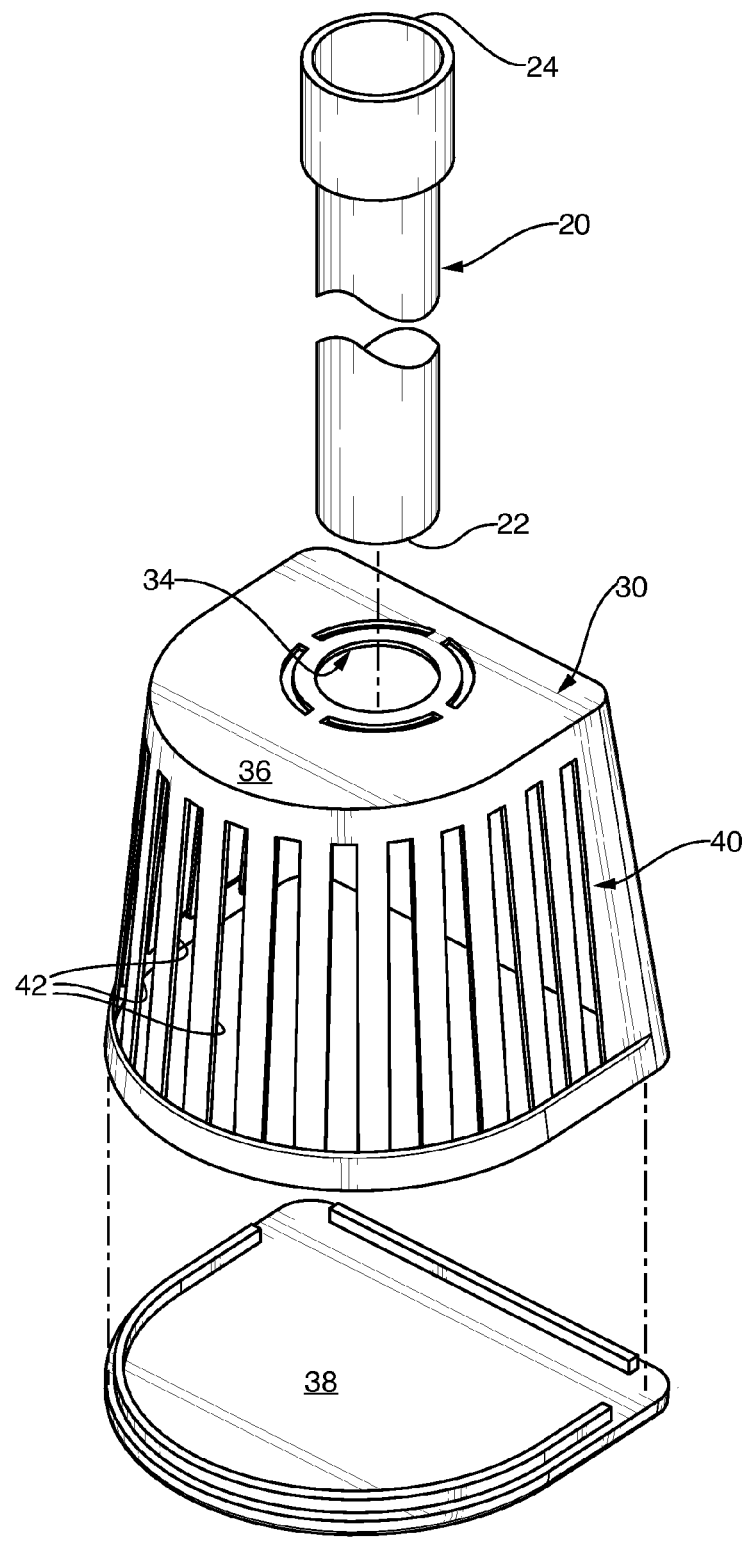
FIG. 4 is an exploded perspective view of the filter intake tube and housing of the filter intake suction guard with the base plate removed.

As seen best in FIGS. 1-2 and 4, housing 30 includes an outlet opening 34 defined in top wall 36. Outlet opening 34 is configured and dimensioned for receipt of filter intake tube 20 therein with first open end 22 of filter intake tube 20 in fluid communication within housing interior 32. Preferably, outlet opening 34 has a diameter which generally corresponds to the outer diameter of filter intake tube 20, so that no gap is provided therebetween where a fish may be able to enter housing interior 32. In a preferred embodiment, filter intake tube 20 is slidably and removably received within outlet opening 34. Alternatively, filter intake tube 20 and housing 30 can be an integral one-piece component. It is also preferred that first open end 22 of filter intake tube 20 is received within housing interior 32. However, in an alternative embodiment, first open end 22 of filter intake tube 20 is connected to top wall 36 to surround outlet opening 34.

As best illustrated in FIGS. 2 and 4, housing 30 also includes a sidewall 40 which is spaced apart from first open end 22 of filter intake tube 20, by a predetermined distance to prevent fish from swimming too close to open end 22 and being subjected to strong filter suction forces. In a preferred embodiment for use in an aquarium, the sidewall is spaced apart approximately 1" to 1½" from first open end 22 of filter intake tube 20. It is preferred that if the guard 10 is utilized in a fish pond which typically has a much larger and stronger filter system, the housing 30 would be larger and the sidewall would be spaced approximately 3" to 4" from the first open end of the filter intake tube. However, it can be appreciated that the size of housing 30 and distance of sidewall 40 from filter intake tube 20 can be modified, such as, depending on the size of the fish or power of the filter system.

As shown best in FIG. 2, sidewall 40 has a plurality of intake or inlet openings 42 defined in at least a portion thereof which allow water to enter from the aquarium tank 104 or pond, into housing interior 32 and, in turn, into filter intake tube 20 and subsequently, filter 102, while maintaining a distance between fish 106 and filter intake tube 20. Inlet openings 42 are configured and dimensioned to be small enough to prevent fish from entering housing interior 32 but to also allow water to enter housing interior 32 and exit housing interior 32 via first open end 22 of filter intake tube 20. In the preferred embodiment, the plurality of inlet openings 42 are vertically extending slots having a width in the range of about 1/16" to ½". More particularly, inlet openings 42 are spaced a minimum of 1/16 of an inch apart for use with fish tanks, but may also be spaced further apart, for example ½ inch apart for use in fish ponds. However, it can be appreciated that the size of the inlet openings 42 may be modified, as needed, depending on the size of the fish 106 in the aquarium and/or strength of the filter suction.

Figure 3:
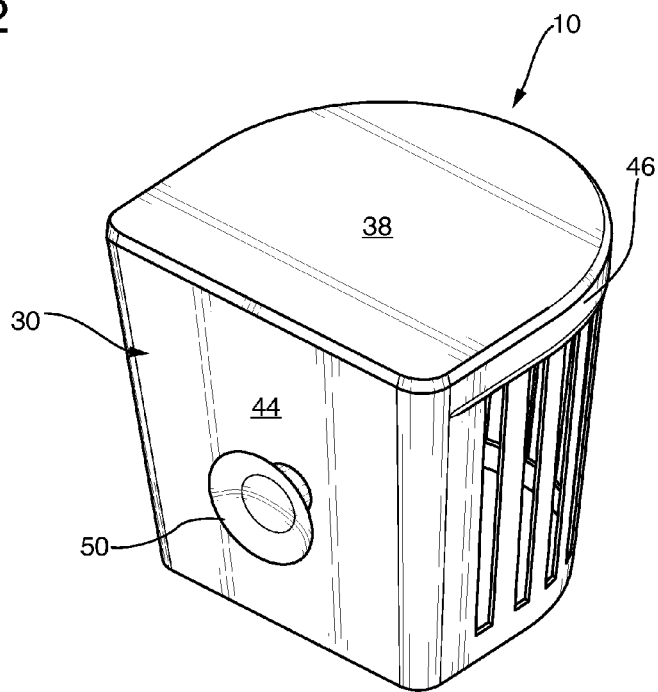
FIG. 3 is a bottom and side perspective view of the housing of the filter intake suction guard.

As seen best in FIGS. 1 and 3, in the preferred embodiment, sidewall 40 has a planar wall portion 44 which, when installed, is disposed against and parallel to wall 108 of aquarium 100 or wall of a fish pond. Sidewall 40 also has a curved portion 46, and, in the preferred embodiment, inlet openings 42 are disposed on only curved portion 46 of sidewall 40. It can be appreciated that inlet openings 42 may be disposed on other locations of housing 30.

Furthermore, guard 10 includes means for removably securing housing 30 to an aquarium 100 or fish pond (not shown). Preferably, guard 10 has a suction cup 50 connected to planar portion 44 of sidewall 40 and which can be removably attached to wall 108 of an aquarium 100 or wall of a fish pond (not shown). However, it can be appreciated that other means to secure the housing 30 to the aquarium may be utilized. For example, in the embodiment where housing 30 is directly connected to filter intake tube 20, as a 1-piece component, the device can connect directly to the filter and no suction cup is necessary.

Figure 5:
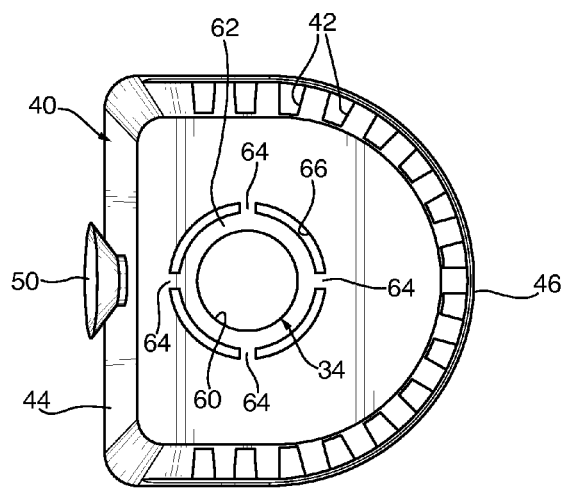
FIG. 5 is a top plan view of the housing of the filter intake suction guard.

Furthermore, not all filter intake tubes 20 have the same outer diameter. Therefore, outlet opening 34 of housing 30 can be adjusted or altered to have different diameters to accommodate different sized filter intake tubes 20. As seen best in FIG. 5, in the preferred embodiment, top wall 36 has an opening 66 defined therein and a removable ring 62 disposed within opening 66. Removable ring 62 having opening 60 defined therein, is attached to top wall 36 of housing 30 via four radially extending frangible tabs 64. Preferably, tabs 64 are disposed approximately 90 degrees apart. However, it can be appreciated that other number of tabs can be provided or other means to connect ring 62 to top wall 36. In use, tabs 64 can break away or be cut to remove ring 62, to expose the larger diameter outer opening 66. This allows for the guard 10 to accommodate different sized intake extension tubes, namely, a smaller diameter filter intake tube 20 within opening 60 in ring 62 and a larger diameter filter intake tube 20 within opening 66, once ring 62 has been removed. In the preferred embodiment, first opening 60 of ring 62 has an inner diameter of ¾" and outer opening 66 has an inner diameter of 1⅛". However, it can be appreciated that the diameters can be modified as necessary depending on the diameter of the filter intake tube 20, such as, for example, larger sized to accommodate fish pond applications where the filter intake suction tube is 1½" to 2" in diameter.

In use, for smaller diameter filter intake tubes 20, the user simply slides outlet opening 34 of guard 10 over the filter intake tube 20, and presses suction cup 50 to the aquarium wall 108 or wall of a fish pond. For larger diameter filter intake tubes 20, the user cuts tabs 64 to remove inner ring 62, to expose larger opening 66. The user then slides outlet opening 34 of guard 10 over filter intake tube 20 and presses suction cup 50 to the aquarium wall 108.

The design of certain power filter intake tubes 20 may require that the filter intake tube 20 be inserted into the guard 10 from underside of top wall 36. In this case, the user must remove base plate 38 from sidewall 40, insert intake tube 20 through outlet opening 34 from the underside of top wall 36, replace base plate 38 by connecting it to sidewall 40, attach filter intake tube 20 to the filter 102 and press suction cup 50 to aquarium wall 108.

Figure 6:
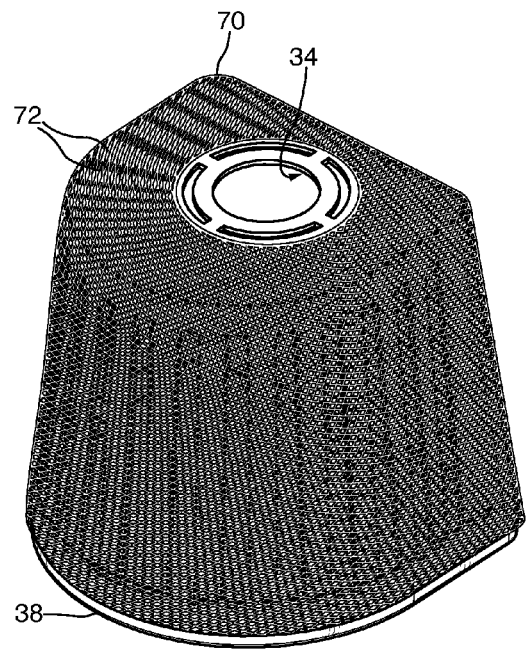
FIG. 6 is a top and side perspective view of the housing of the filter intake suction guard, like FIG. 2, but with a net enveloping the inlet openings.

In addition, as illustrated in FIG. 6, it is optional that guard 10 also include a net or micro screen 70 having a plurality of small mesh-like openings 72 therein for use in an aquarium or pond containing newborn or very tiny fish. Net 70 envelopes and covers inlet openings 42 of housing 30. The openings 72 in net 70 have diameters which are smaller than inlet openings 42 of housing 30. Preferably, the openings 72 have a diameter in the range of 1/32" to 1/16" for use in an aquarium or ¼" to ¾" for use in a fish pond. However, it can be appreciated that the size of the openings may be modified. This serves to prevent newborn fish or very tiny fish from entering housing interior 32 via any one of the plurality of inlet openings 42. It can be appreciated that the micro screen 70 can be pre-assembled to guard 10 or a separate component which the user can affix to guard 10. In a preferred embodiment, net 70 may be stitched along its upper edge and have an opening formed therein for outlet opening 34 and an opening or slit to allow suction cup 50 to project outwardly therefrom. Preferably, net 70 is held on to guard 10 by base wall 38.

While particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention.

What is claimed is:

1. A filter intake suction guard for a member selected from the group consisting of an aquarium filter and a pond filter of the type having a tubular filter intake tube with a first open end intended to be disposed within a body of water contained within a member selected from the group consisting of an aquarium and a pond and an opposite second open end which is connectable to the filter, comprising:

a substantially enclosed hollow housing defining a substantially unobstructed housing interior cavity therein and having an outlet opening defined therein which is configured and dimensioned for receipt of the filter intake tube therein with the first open end of the filter intake tube in fluid communication within said housing interior cavity, said housing further comprising a first wall having an interior side and an exterior side, wherein said first wall is configured and dimensioned to be disposed radially outwardly from the first open end of the filter intake tube, with said interior side of said first wall being radially spaced apart a predetermined distance from the first open end of the filter intake tube, when the first open end of the filter intake tube is received within said outlet opening, to provide a spaced distance between a fish and the first open end of the filter intake tube, to prevent the fish from being suctioned by the filter intake tube, said first wall comprising a plurality of intake openings defined in at least a portion thereof and which are configured and dimensioned to prevent fish from entering said housing interior cavity but allow water to enter said housing interior cavity and exit said housing interior cavity via the first open end of the filter intake tube.

2. The guard according to claim 1, wherein:
said first wall is a sidewall;
said housing further comprises a top wall and a bottom base plate, each having an outer peripheral edge; and
said sidewall is generally upstanding and has an upper edge connected to said outer peripheral edge of said top wall and a lower edge connected to said outer peripheral edge of said base plate,
and wherein said outlet opening is disposed on said top wall and said plurality of intake openings are disposed on at least a portion of said sidewall.

3. The guard according to claim 2, wherein:
said base plate of said housing is removable.

4. The guard according to claim 2, wherein:
said sidewall has a planar portion and a curved portion, and said top wall and said base plate are half oval-shaped and planar.

5. The guard according to claim 4, wherein:
said plurality of intake openings are vertically extending slots on said curved portion of said sidewall.

6. The guard according to claim 5, wherein:
said sidewall has a height and said slots extend substantially said height of said sidewall.

7. The guard according to claim 1, further comprising:
means for removably securing said housing to an aquarium.

8. The guard according to claim 7, wherein:
said means for removably securing said housing to an aquarium is a suction cup connected to said housing.

9. The guard according to claim 1, wherein:
said plurality of inlet openings have a width in the range of about 1/16" to 1/2".

10. The guard according to claim 1, wherein:
said outlet opening has a diameter and said guard further comprises means for altering said diameter of said outlet opening.

11. The guard according to claim 10, wherein:
said means for altering said diameter of said outlet opening comprises a first opening defined in said top wall and a removable ring disposed within said first opening and attached to said top wall of said housing via at least one radially extending frangible tab.

12. The guard according to claim 11, further comprising:
four radially extending frangible tabs disposed approximately 90 degrees apart.

13. The guard according to claim 1, further comprising:
a net having a plurality of mesh-like openings defined therein for enveloping at least said plurality of inlet openings of said housing,
and wherein said openings in said net have diameters which are smaller than said inlet openings of said housing.

14. The guard according to claim 1, wherein:
said first wall is spaced apart in the range of approximately 1" to 4" from the first open end of the filter intake tube.

15. The guard according to claim 1, wherein:
said outlet opening has a diameter which generally corresponds to an outer diameter of the filter intake tube.

16. A filter intake suction guard assembly for a member selected from the group consisting of an aquarium filter and a pond filter, comprising:
a generally tubular filter intake tube having a first open end intended to be disposed within a body of water contained within a member selected from the group consisting of an aquarium and a pond and an opposite second open end which is connectable to the filter;
a filter intake suction guard connected to said filter intake tube, comprising a substantially enclosed hollow housing defining a substantially unobstructed housing interior cavity therein and having an outlet opening defined therein for receipt of said filter intake tube therein with the first open end of the filter intake tube in fluid communication within said housing interior cavity,
said housing further comprising a first wall having an interior side and an exterior side, wherein said first wall is disposed radially outwardly from the first open end of the filter intake tube, with said interior side of said first wall being radially spaced apart a predetermined distance from said first open end of said filter intake tube, when said first open end of said filter intake tube is received within said outlet opening, to provide a spaced distance between a fish and the first open end of the filter intake tube, to prevent the fish from being suctioned by the filter intake tube, said first wall comprising a plurality of intake openings defined in at least a portion thereof and which are configured and dimensioned to prevent fish from entering said housing interior cavity but allow water to enter said housing interior cavity and exit said housing interior cavity via said first open end of said filter intake tube.

17. The assembly according to claim 16, wherein:
said filter intake tube and said guard are integral.

18. The assembly according to claim 16, wherein:
said filter intake tube and said guard are removably connected together.

19. A method of preventing fish from entering a member selected from the group consisting of an aquarium filter and a pond filter, comprising:
providing a filter and a filter intake tube with a first open end intended to be disposed within a body of water contained within a member selected from the group consisting of an aquarium and a pond and an opposite second open end which is connectable to the filter;
providing a filter intake suction guard for said filter intake tube, comprising a substantially enclosed hollow housing defining a substantially unobstructed housing interior cavity therein and having an outlet opening defined therein which is configured and dimensioned for receipt of said filter intake tube therein with said first open end of said filter intake tube in fluid communication within said housing interior cavity, said housing further comprising a first wall having an interior side and an exterior side, wherein said first wall is disposed radially outwardly from the first open end of the filter intake tube, with said interior side of said first wall being radially spaced apart a predetermined distance from said first open end of said filter intake tube, when said first open end of said filter intake tube is received within said outlet opening, to provide a spaced distance between a fish and the first open end of the filter intake tube, to prevent the fish from being suctioned by the filter intake tube, said first wall comprising a plurality of intake openings defined in at least a portion thereof and which are configured and dimensioned to prevent fish from entering said housing interior cavity but allow water to enter said housing interior cavity and exit said housing interior cavity via said first open end of said filter intake tube; and positioning said filter intake tube within said outlet opening of said housing with said first open end of said filter intake tube in fluid communication within said housing interior.

* * * * *